United States Patent
Hong et al.

(10) Patent No.: US 8,572,017 B2
(45) Date of Patent: Oct. 29, 2013

(54) USER-BASED COLLABORATIVE FILTERING RECOMMENDATION SYSTEM AND METHOD FOR AMENDING SIMILARITY USING INFORMATION ENTROPY

(75) Inventors: Kwang Seok Hong, Gwacheon-si (KR); Hyeong Joon Kwon, Gyeonggi-do (KR)

(73) Assignee: Sungkyunkwan University Foundation For Corporate Collaboration, Suwon, Gyeonggi-do (KR)

( * ) Notice: Subject to any disclaimer, the term of this patent is extended or adjusted under 35 U.S.C. 154(b) by 939 days.

(21) Appl. No.: 12/692,575

(22) Filed: Jan. 22, 2010

(65) Prior Publication Data

US 2010/0185579 A1     Jul. 22, 2010

(30) Foreign Application Priority Data

Jan. 22, 2009   (KR) ........................ 10-2009-0005583

(51) Int. Cl.
*G06N 99/00*    (2010.01)
*G06N 5/04*    (2006.01)

(52) U.S. Cl.
CPC ...................................... *G06N 5/04* (2013.01)
USPC .......................................................... 706/54

(58) Field of Classification Search
USPC .................................................... 706/46–58
See application file for complete search history.

(56) References Cited

PUBLICATIONS

Piao, Chunhui et al.; "Research on Entropy-based Collaborative Filtering Algorithm"; 2007; IEEE International Conference on e-Business Engineering; pp. 213-220.*
Kwon, Hyeong-Joon et al.; "Improved Memory-based Collaborative Filtering Using Entropy-based Similarity Measures"; 2009; Proceedings of the 2009 International Symposium on Web Information Systems and Applications; pp. 29-34.*
Kwon, Hyeong-Joon; "Improving Prediction Accuracy Using Entropy Weighting in Collaborative Filtering"; 2009; IEEE; Symposia and Workshops on Ubiquitous, Autonomic and Trusted Computing; pp. 40-45.*
Wang, Fu Lee; "Improvements to Collaborative Filtering Systems"; 2004; Springer-Verlage; pp. 975-981.*
Hong, Kwang Seok et al.; "User-Based Collaborative Filtering Recommendation System and Method for Amending Similarity Using Information Entropy"; Jan. 22, 2009; English Translation of foreign priority document (KR10-2009-0005583); 13 pages.*

(Continued)

*Primary Examiner* — Jeffrey A Gaffin
*Assistant Examiner* — Stanley K Hill
(74) *Attorney, Agent, or Firm* — Blakely Sokoloff Taylor & Zafman LLP (57) ABSTRACT

The present invention relates to a user-based collaborative filtering recommendation method and system and, more specifically, relates to a user-based collaborative filtering recommendation method and system which amends the similarity between the recommend probable user and the other user to improve the accuracy in the prediction of preference by using the relation between the user preference information entropies of the recommend probable user and the other user.

6 Claims, 7 Drawing Sheets

(56) References Cited

PUBLICATIONS

Hong, Kwang Seok et al.; "User-Based Collaborative Filtering Recommendation System and Method for Amending Similarity Using Information Entropy"; Dec. 3, 2010; English Translation of Specification Amendment for foreign priority document (KR10-2009-0005583); 4 pages.*

Gediminas Adomavicius et al., "Toward the Next Generation of Recommender Systems: A Survey of the State-of-the-Art and Possible Extensions", Jun. 2005, pp. 734-749, vol. 17, No. 6, IEEE Computer Society.

Christina Christakou et al., "A Movie Recommender System Based on Semi-supervised Clustering", Proceedings of the 2005 International Conference on Computational Intelligence for Modeling, Control and Automation, and International Conference Intelligent Agents, 2005, 6 Pages, IEEE Computer Society.

Bradley N. Miller et al., "MovieLens Unplugged: Experiences with an Occasionally Connected Recommender System", Jan. 12-15, 2003, pp. 263-266, IUI'03, Miami, Florida, USA.

Grouplens Research, "MovieLens Data Sets", retrieved from the Internet: http://grouplens.org/node/73, 1 page, Apr. 9, 2013, best available copy.

* cited by examiner

USER-BASED COLLABORATIVE FILTERING RECOMMENDATION SYSTEM AND METHOD FOR AMENDING SIMILARITY USING INFORMATION ENTROPY

BACKGROUND OF THE INVENTION

1. Field of the Invention

The present invention relates to a user-based collaborative filtering recommendation method and a system and, more specifically, a user-based collaborative filtering recommendation method and a system which amend the similarity between the recommend probable user and the other users to improve the accuracy in the prediction of preference by using the relation between the user preference information entropies of the recommend probable user and the other users as a weight value.

2. Background of the Invention

As the concept of the participation, opening and sharing on line spreads gradually, the existing boundary between the information provider and consumer is being collapsed. Therefore, there is an increasing level of expectation that the information desired by a user should exist on line necessarily. However, because a tremendous amount of information is being provided without being verified, it is worried that the reliability of the information on line is lowered. Moreover, it requires a considerable amount of time to search the desired information among the verified information. To improve these problems, so-called personalization service of providing data useful for a user draws attention recently.

The recommendation system which is one of the personalization services is a system to induce the interest of the user (who will be referred to as "the recommend probable user" hereinafter) more by recommending only the information in which the user can be interested among a large amount of information. The recommendation system analyzes the relation between the history of previous selection of the recommend probable user, the attribute information like the concern, age and gender of the recommend probable user and the information required by the recommend probable user, in order to recommend the most suitable items to the recommend probable user.

The user-based collaborative filtering recommendation system among many kinds of recommendation systems is a recommendation system that can predict the preference of the recommend probable user for an item by using preference information obtained from many users. For example, as shown in Table 1 below, in a case where users 1 to 3 express preference for a part of items 1 to 4, the recommendation system predicts the preference for the items that each user does not select (for example, in case of user 1, the preference for item 2 or 3 and in case of user 3, the preference for item 4.)

TABLE 1

|        | Item 1 | Item 2 | Item 3 | Item 4 |
|--------|--------|--------|--------|--------|
| User 1 | 1      |        |        | 2      |
| User 2 | 2      | 2      | 3      | 4      |
| User 3 | 2      | 3      | 5      |        |

In order to evaluate the capacity of the collaborative filtering recommendation system, i.e., in order to know how accurate the preference predicted through the collaborative filtering recommendation system is, the capacity is evaluated by obtaining the mean absolute error between the preference predicted through the collaborative filtering recommendation system and the actual preference given by the user. The smaller the mean absolute error becomes, the more excellent the capacity is evaluated to be.

Figure 1:
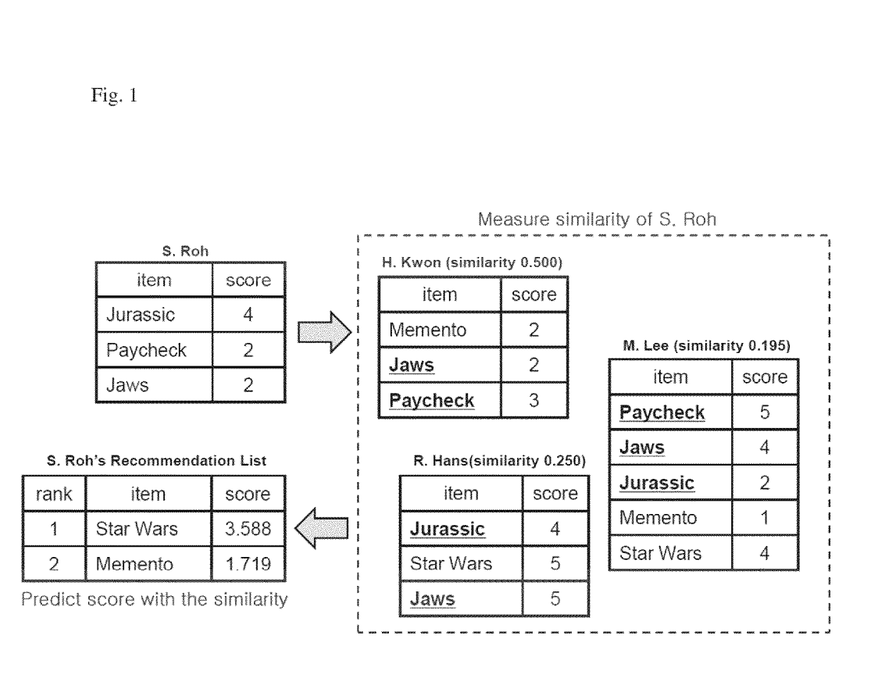
FIG. 1 illustrates a user-based collaborative filtering method.

FIG. 1 illustrates the user-based collaborative filtering method. The table on the left upper end shows the S. Roh's preference for three movies of Jurassic, Paycheck and Jaws. Tables that display the preferences of H. Kwon, R. Hans and M. Lee for the movies and their similarity with the recommend probable user are illustrated in the blocks displayed by the dotted line on the right side. According to the user-based collaborative filtering method illustrated in FIG. 1, it can predict the preference for the movies that are not selected by the recommend probable user, for example, Star Wars and Memento, as shown in the table on the left lower end, by referring to the preference of the other users within the block for the movies for which the recommend probable user does not express his preference and the similarity between the S. Roh, the recommend probable user, and the other users.

However, because the user-based collaborative filtering method does not include the method of amending the similarity related to the recommend probable user, the capacity of the user-based collaborative filtering method is likely to be deteriorated. That is, the preference predicted by the user-based collaborative filtering method is likely to be greatly different from the actual preference of the recommend probable user.

BRIEF SUMMARY OF THE INVENTION

The present invention is invented in consideration of the above points, and has an objective of providing user-based collaborative filtering recommendation system and method capable of predicting more accurately the preference of the recommend probable user by amending the similarity related to the recommend probable user in user-based collaborative filtering recommendation system and method.

As a user-based collaborative filtering recommendation method for solving the above tasks, provided is a user-based collaborative filtering recommendation method comprising: a first step of calculating the similarity between a recommend probable user A and an other user B; a second step of amending the calculated similarity by using each user preference information entropy of the recommend probable user A and the other user B; a third step of forming a nearest neighbor list of the recommend probable user A based on the amended similarity; and a fourth step of predicting the preference of the recommend probable user A by using the preference of the users in the formed nearest neighbor list.

Preferably, the second step of amending the similarity is to amend the similarity by using the relation between the user preference information entropy of the other user B and the user preference information entropy of the recommend probable user A obtained by using the information entropy calculation method of Claude Shannon as a weight value.

Preferably, the second step of amending the similarity comprises the steps of: obtaining the information entropy H(A) of the recommend probable user A and the information entropy H(B) of the other user B; obtaining the difference value between the information entropy H(A) of the recommend probable user A and the information entropy H(B) of the other user B; obtaining a reciprocal number of the value obtained by adding 1 to the difference value between the H(A) and H(B); and obtaining the value obtained by multiplying the similarity between the other user and the recommend probable user calculated in the similarity calculating step by the reciprocal number of the value obtained by adding 1 to the difference value between H(A) and H(B) as amended similarity.

Preferably, the weight value that is multiplied by the similarity calculated in the first step is more than 0 and less than 1.

Preferably, the user-based collaborative filtering recommendation method further comprises a fifth step of letting the recommend probable user A input actual preference for an item for which the recommend probable user A does not express his preference before and comparing the input actual preference with the preference predicted in the fourth step.

Preferably, the fourth step is performed after the first, the second and the third steps are performed for all users.

According to another aspect of the present invention, a user-based collaborative filtering recommendation system for predicting and recommending the preference of the recommend probable user A by using the preference of the users in the nearest neighbor list of the recommend probable user A comprises: a similarity calculator 32 for calculating the similarity between the recommend probable user A and the other user B; an entropy calculator 34 for calculating the information entropy H(A) and H(B), defined by Claude Shannon, of the recommend probable user A and the other user B; and a similarity amender 33 for amending the similarity received from the similarity calculator 32 by using the relation between the information entropy H(A) of the recommend probable user A and the information entropy H(B) of the other user B received from the entropy calculator 34 as a weight value.

Preferably, the weight value is $(|H(A)-H(B)|+1)^{-1}$ and is multiplied by the similarity calculated by the similarity calculator 32.

Preferably, the weight value is larger than 0 and is less than 1.

Preferably, the user-based collaborative filtering recommendation system further comprises: a nearest neighbor generator 35 for generating a nearest neighbor list based on the similarity amended by the similarity amender 33; and a preference predictor 36 for predicting the preference of an item which the recommend probable user A does not select considering the amended similarity of users belonging to the nearest neighbors based on the formed nearest neighbor list.

Preferably, the user-based collaborative filtering recommendation system further comprises a capacity measurer 39 for evaluating the capacity of the entire system by comparing the actual preference and the predicted preference in a case where actual preference is input by the recommend probable user A.

According to the present invention, one can form a nearest neighbor list having high actual similarity because the similarity of the recommend probable user is amended by using the information entropy of the recommend probable user and the other user. Therefore, the present invention has the effects of improving the accuracy of preference prediction of the recommend probable user.

DESCRIPTION OF EMBODIMENTS

Hereinafter, exemplary embodiments of the invention are described in detail with reference to accompanying drawings and tables.

Figure 2:
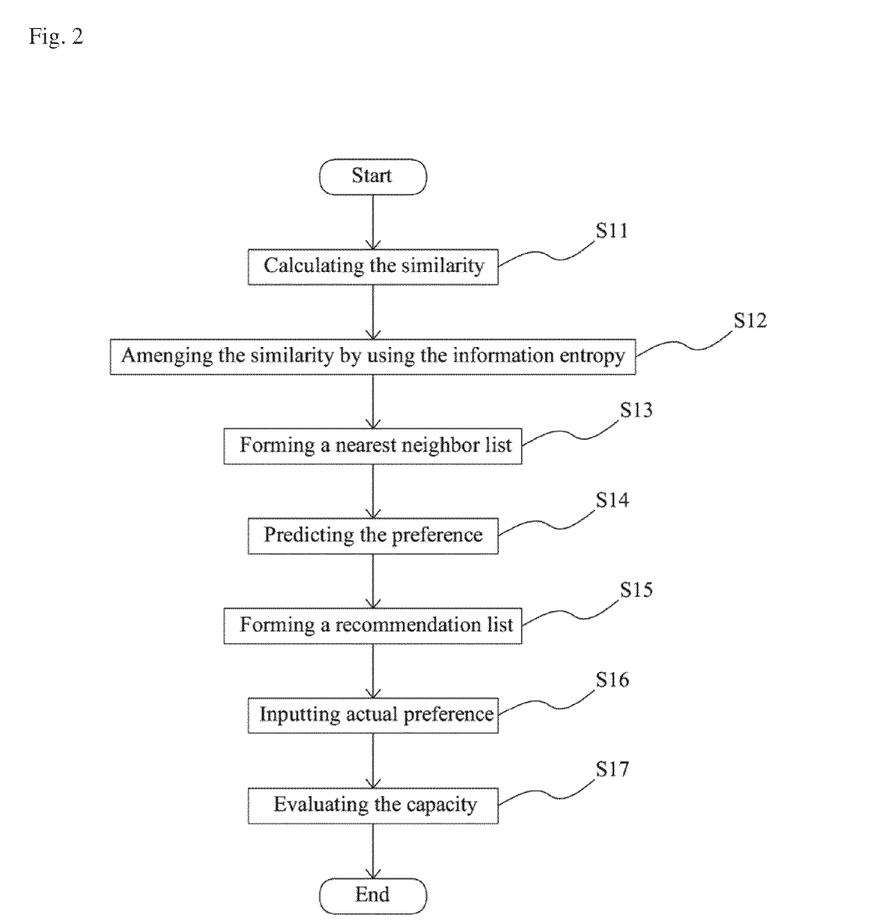
FIG. 2 shows the flow of a user-based collaborative filtering recommendation method according to an exemplary embodiment of the present invention roughly.

FIG. 2 shows the flow of a user-based collaborative filtering recommendation method according to an exemplary embodiment of the present invention roughly.

The user-based collaborative filtering recommendation method according to one exemplary embodiment of the present invention comprises a first step (S11) of calculating the similarity between the recommend probable user and the other user; a second step (S12) of amending the calculated similarity by using the user preference information entropy; a third step (S13) of forming a nearest neighbor list based on the amended similarity; a fourth step (S14) of predicting the preference of the recommend probable user based on the formed nearest neighbor list; a fifth step (S15) of preparing a recommendation list that arranges the predicted preference; a sixth step (S16) of inputting the actual preference of the recommend probable user; and a seventh step (S17) of evaluating the capacity of the collaborative filtering recommendation by comparing the preference predicted in the fourth step and the actual preference input in the sixth step.

The first step (S11) of calculating the similarity between the recommend probable user and the other user is a step of calculating the similarity through the items for which the two users express the preference in common. There are a method of calculating an angle (Cosine Similarity) or a distance (Euclidean Distance) by assuming the user-item preference matrix as multi-dimensional coordinates in a vector space or a Euclidian space, a method of using correlation analysis according to the probability theory and statistical method (Pearson, Spearman Correlation Coefficient, etc.) and a method of using the ratio of intersection (Tanimoto Coefficient) as methods of calculating similarity in the first step (S11). Here, the calculated similarity has a range of 0 to 1, and is normalized to be more similar as it gets closer to 1.

In the second step (S12) of amending the calculated similarity by using the user preference information entropy, the information entropy defined by Claude Shannon is used as the user preference information entropy. Also, the relation between the information entropy H(A) of the recommend probable user A and the information entropy H(B) of the other user B is used as a weight value. Then, the similarity obtained in the aforesaid step (S11) is amended by multiplying the aforesaid a weight value by the similarity between the recommend probable user A and the other user B obtained in the aforesaid step (S11).

In the present exemplary embodiment, the second step (S12) of amending the calculated similarity comprises: obtaining the information entropy H(A) of the recommend probable user A and the information entropy H(B) of the other user; obtaining the difference value |H(A)−H(B)| between the information entropy H(A) of the recommend probable user A and the information entropy H(B) of the user B; obtaining a reciprocal number $(|H(A)-H(B)|+1)^{-1}$ of the value obtained by adding 1 to the difference value between H(A) and H(B), $|H(A)-H(B)|$; and obtaining the value obtained by multiplying the similarity between the recommend probable user A and the other user B obtained in the first step (S11) by the aforesaid reciprocal value as amended similarity.

The information entropy H(A) and H(B) of the present embodiment can be obtained by the following equation 1 and the amended similarity SimE W(A,B) of the present embodiment can be obtained by the following equation 2.

$$H(A)=-\Sigma_{i=1}{}^{n}P(x_i)\log_2 P(x_i)$$

$$H(B)=-\Sigma_{i=1}{}^{n}P(y_i)\log_2 P(y_i) \quad \text{[Equation 1]}$$

$$SimEW(A,B)=\text{similarity}(A,B)\times(|H(A)-H(B)|+1)^{-1} \quad \text{[Equation 2]}$$

The third step (S13) of forming the nearest neighbor list based on the amended similarity is a step of setting up a user group having high amended similarity that is required to increase the accuracy of the preference prediction of the recommend probable user A and the range of the amended similarity or the number of users included in the nearest neighbor required to form the nearest neighbor list can be selected according to the design specifications of the collaborative filtering recommendation system or method, considering many elements like the number of entire users or the number of items in the data set. Also, in the initial performance of the method according to the present exemplary embodiment, the third step (S13) of forming the nearest neighbor list can be performed after the first step (S11) of calculating the similarity between the recommend probable user A and the other user B and the second step (S12) of amending the calculated similarity are performed repeatedly as many times as the number of the users in the date set. In connection with this, the nearest neighbor list can be formed by storing the similarity calculated in the first step (S11) and the similarity amended in the second step (S12) in a predetermined storing space and including the users having similarity suitable for the standard according to the design specifications in the nearest neighbor list, whenever the first step (S11) of calculating the similarity between the recommend probable user A and the other user B and the second step (s12) of amending the calculated similarity are performed once.

In the fourth step (S14) of predicting the preference of the recommend probable user based on the formed nearest neighbor list, it predicts the preference for the items that are not selected by the recommend probable user by considering the amended similarity of the users belonging to the nearest neighbors after the nearest neighbor list is formed. There are methods of A weighted Average, A weighted K-nearest Neighborhood and Bias-From-Mean as methods of predicting the preference.

The fifth step (S15) of preparing the recommendation list that arranges the predicted preference is a step of arranging the preference predicted in the fourth step (S14) and preparing a list to be recommended to the recommend probable user. They can be arranged in descending order (or ascending order) based on the size of the predicted preference or they can be arranged in various methods according to the order of items or the order in which the attributes of the recommend probable user are reflected.

When the actual preference of the recommend probable user is input through the sixth step (S16), the seventh step (S17) of evaluating the capacity of the collaborative filtering recommendation by comparing the preference predicted in the fourth step and the actual preference input in the sixth step is performed. That is, the capacity of the user-based collaborative filtering recommendation method is decided to be excellent if there is no big difference value as a result of comparing the preference predicted in the fourth step and the actual preference input in the sixth step, and if there is big difference value, the capacity of the user-based collaborative filtering recommendation method is decided to be inferior. However, the critical value used to distinguish the inferiority and the superiority of the capacity can be decided according to the design specifications.

The similarity amendment disclosed in Table 2 below is based on the presumption of a very extreme case and is used to show that the order according to the existing similarity in case of not considering the information entropy value of each user and the order according to the similarity amended considering the Information entropy value of each user can be reversed completely. Here, it is presumed that the information entropy of S. Roh, the recommend probable user, is 1.292.

TABLE 2

| Existing order | Name of user | Existing similarity | Information entropy | Amended similarity | Changed order |
|---|---|---|---|---|---|
| 1 | H. Kwon | 0.951 | 2.128 | 0.517 | 3 |
| 2 | M. Lee | 0.942 | 0.948 | 0.700 | 2 |
| 3 | R. Hans | 0.872 | 1.245 | 0.832 | 1 |

The following shows the amendment of similarity in case of using the actual data set. The data set used in the present invention is MovieLens data set (http://grouplens.org/node/73). This MovieLens data set is the actual data set that has been cited in "Toward the Next Generation of Recommendation Systems: A Survey of the State-of-the-Art and Possible Extensions" of Gediminas Adomavicius, et al. (IEEE TRANSACTIONS ON KNOWLEDGE AND DATA ENGINEERING, VOL. 17, NO. 6, June 2005), "MovieLens Unplugged: Experiences with an Occasionally Connected Recommendation System" of B. N. Miller et al. (Proceedings of the 8th international conference on Intelligent user interfaces, 2003), and "A Movie Recommendation System Based on Semi-supervised Clustering" of Christina Christakou et al. (Proceedings of the 2005 International Conference on Computational Intelligence for Modelling, Control and Automation, and International Conference on Intelligent Agents, Web Technologies and Internet Commerce (CIMCA-IAWTIC '05)). The MovieLens data set consists of 100,000 data in which 943 users express their preference for 1,682 movies.

If you consider the case of two users between which there is the greatest difference value in information entropy in the data set, in order to see to what degree the similarity before amendment can be reduced by the similarity amendment using the information entropy presented by the present invention, it is shown as follows.

That is, the information entropy of user 928 having the minimum information entropy and the information entropy of user 863 having the maximum information entropy are 0.868 and 2.311, respectively. 0.409, the weight value $(|H(A)-H(B)|+1)^{-1}$ that is multiplied by the similarity (A, B) on the right side of equation 2 is obtained from this, and thus it can be seen that even if the similarity before amendment is reduced at the greatest level, it will be reduced to 40% level of the similarity before amendment.

Table 3 below shows the existing similarity ranking and the amended similarity ranking of user 931, the actual user in the MovieLens data set (the information entropy is 1.829), and it can be seen that the similarity ranking is changed by the similarity amendment according to the present invention.

TABLE 3

| Existing ranking | User number | Existing similarity | Information entropy | Amended similarity | Changed ranking |
|---|---|---|---|---|---|
| 1 | 845 | 0.777 | 2.062 | 0.630 | 1 |
| 2 | 821 | 0.763 | 1.545 | 0.593 | 3 |
| 3 | 928 | 0.738 | 0.868 | 0.375 | 4 |
| 4 | 890 | 0.708 | 2.006 | 0.601 | 2 |

Figure 3:
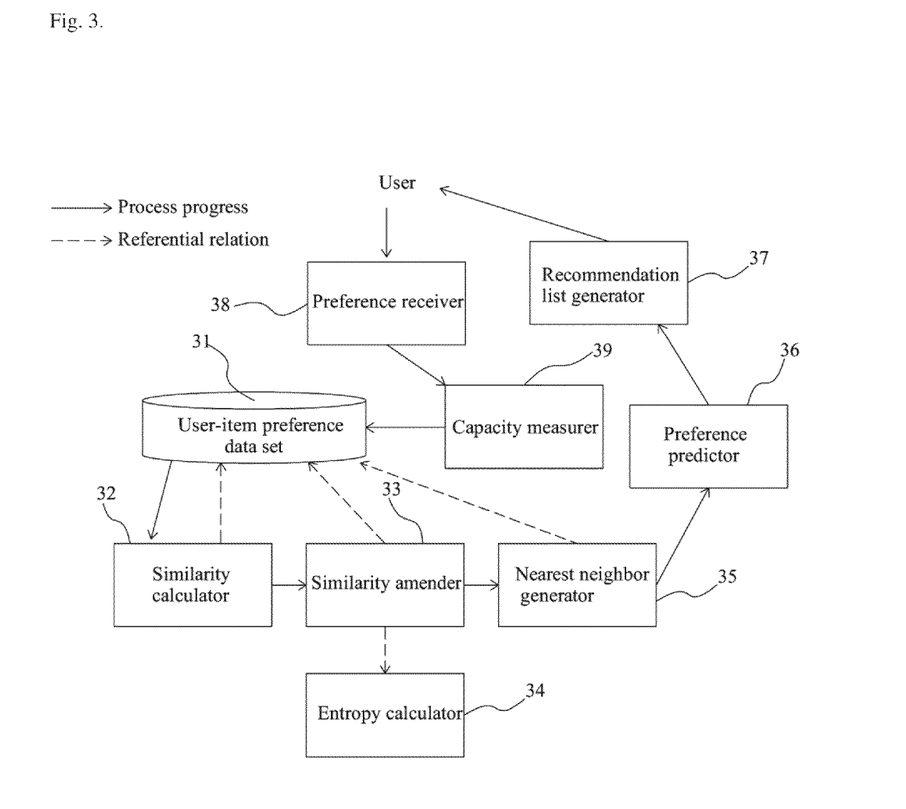
FIG. 3 shows a user-based collaborative filtering recommendation system according to an exemplary embodiment of the present invention.

FIG. 3 shows a user-based collaborative filtering recommendation system according to an exemplary embodiment of the present invention.

The user-based collaborative filtering recommendation system comprises a user-item preference data set 31; a similarity calculator 32; a similarity amender 33; an entropy calculator 34; a nearest neighbor former 35; a preference predictor 36; a recommendation list generator 37; a preference receiver 38; and a capacity measurer 39.

In the user-item preference data set 31, in a case where the user inputs his preference for a specific item, "the user identified by the user name or the user number"-"the preference for a specific item input by the concerned user" are recorded in a pair.

The similarity calculator 32 calculates the similarity based on the pair of the user-item preference recorded on the user-item preference data set 31 when calculating the similarity of the recommend probable user A and the other user B, and is constituted to calculate the similarity with the recommend probable user A by any one of a method of calculating an angle (Cosine Similarity) and a distance (Euclidean Distance) by assuming the user-item preference matrix as multi-dimensional coordinates in a vector space or a Euclidian space, a method of using correlation analysis according to the probability theory and statistical method (Pearson, Spearman Correlation Coefficient, etc.) and a method of using the ratio of intersection (Tanimoto Coefficient).

The entropy calculator 34 is constituted to calculate the information entropy defined by (Claude Shannon) for each user as displayed in equation 1 above.

The similarity amender 33 to which the similarity calculated by the similarity calculator 32 is transmitted obtains the weight value $(|H(A)-H(B)|+1)^{-1}$ that is multiplied by the similarity (A, B) on the right side of equation 2 by using the information entropy H(A) and H(B) of each user calculated by the entropy calculator 34 and then obtains the amended similarity SimEW(A, B) by multiplying this weight value by the similarity (A, B) calculated by the similarity calculator 32.

The nearest neighbor former 35 forms a nearest neighbor list based on the similarity amended by the similarity amender 33. The nearest neighbor list is a user group having high amended similarity that is required to increase the accuracy of the preference prediction of the recommend probable user A. The range of the amended similarity or the size of the nearest neighbor list required to select the users to be included in the nearest neighbor list (that is, the number of users to be included in the nearest neighbor list) can be selected according to the design specifications of the collaborative filtering recommendation system, considering many elements like the number of entire users or the number of items in the data set. Also, the nearest neighbor list can be updated by the similarity calculation and similarity amendment accompanying the update of the user-item preference data set 31.

The preference predictor 36 is constituted to predict the preference of the recommend probable user based on the nearest neighbor list formed by the methods of A weighted Average, A weighted K-nearest Neighborhood and Bias-From-Mean. It predicts the preference for the item that is not selected by the recommend probable user considering the amended similarity of users belonging to the nearest neighbor list.

The recommendation list generator 37 is constituted to prepare a recommendation list that arranges the predicted preference. The arrangement can be made in descending order (or in ascending order) based on the size of the predicted preference or can be made in various ways like in order of items or in order on which the attributes of the recommend probable user are reflected.

The preference receiver 38 is constituted to make the actual preference of the recommend probable user input thereto. The preference receiver 38 transmits the actual preference to the capacity measurer 39. The capacity measurer 39 to which the actual preference is transmitted can evaluate the capacity of the user-based collaborative filtering recommendation system by comparing the predicted preference obtained from the preference predictor 36 or the recommendation list generator 37 and the actual preference. Likewise, the capacity measurer 39 is constituted to be connected between the preference receiver 38 and the user-item preference data set 31 and measures the capacity of the concerned system whenever the actual preference is input by the user.

According to another exemplary embodiment of the present invention, differently from what is illustrated, the capacity measurer 39 can be constituted to be used when necessary. That is, in order to make the actual preference of the recommend probable user for a specific item that is input through the preference receiver 38 be recorded in the user-item preference data set 31 directly, the preference receiver 38 and the user-item preference data set 31 are directly connected and the capacity measurer 39 is constituted to be comprised separately to measure the capacity periodically or when necessary.

In FIG. 3, it is obvious to a person who has common knowledge in this field that the connection and the operation order of a part of constitutional elements can be changed or omitted without going beyond the concept of the present invention. Therefore, one should understand that the constitution and action of the user-based collaborative filtering recommendation system according to the present invention is not limited by what is disclosed in FIG. 3.

Figure 4:
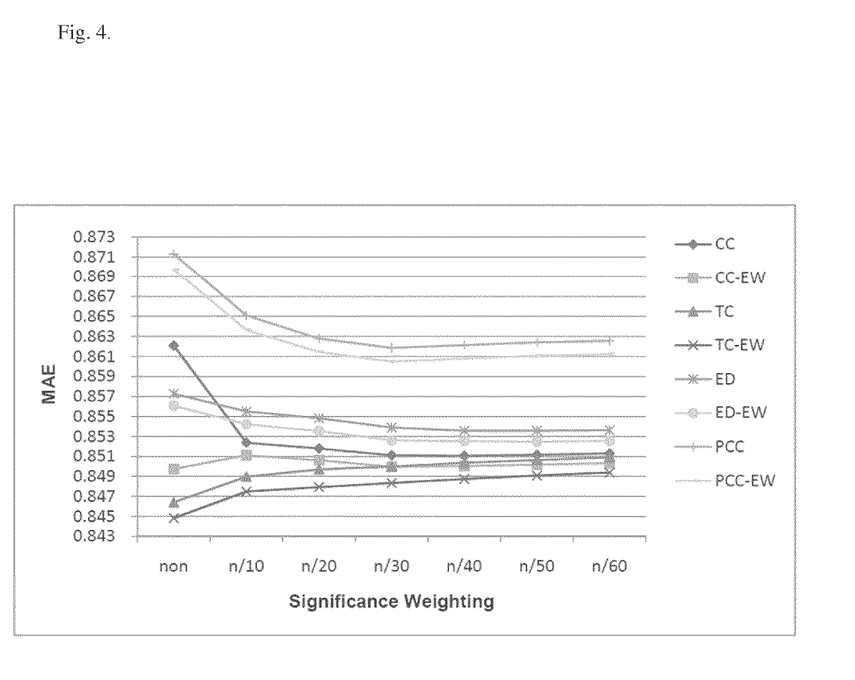
FIG. 4 is a graph showing the results of measuring the mean absolute error in a user-based collaborative filtering recommendation system using 30,000 MovieLens data sets.
Figure 5:
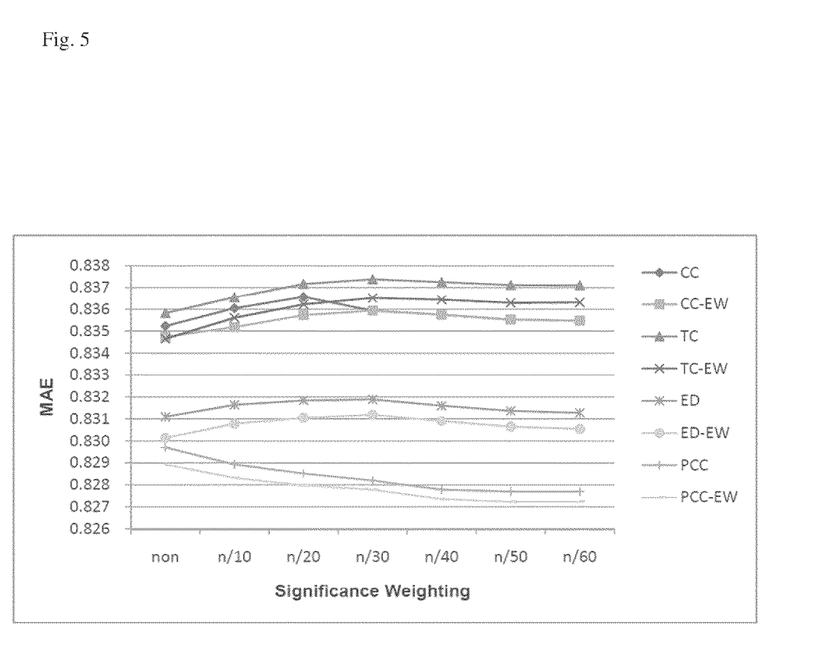
FIG. 5 is a graph showing the results of measuring the mean absolute error in a user-based collaborative filtering recommendation system using 60,000 MovieLens data sets.
Figure 6:
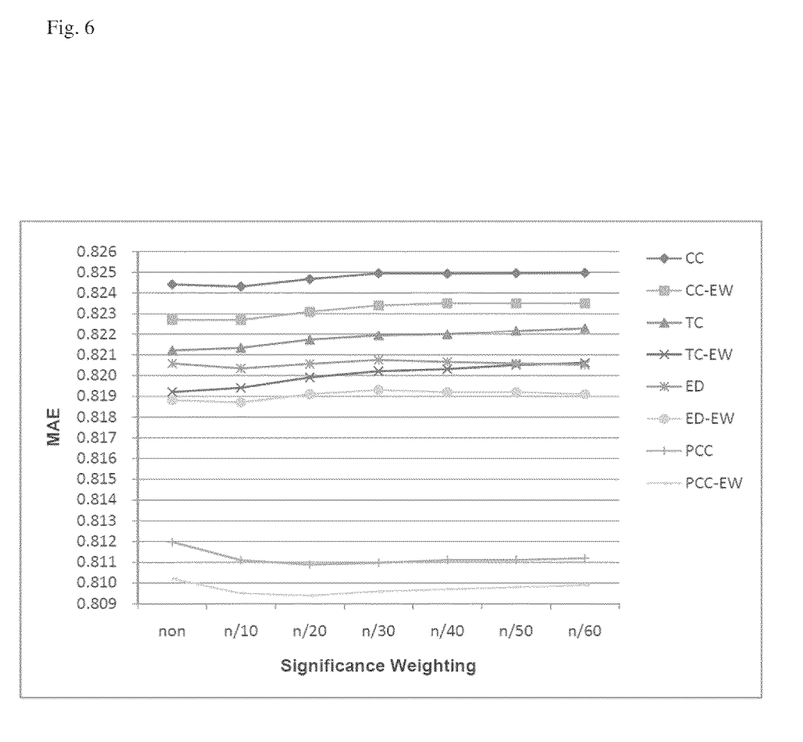
FIG. 6 is a graph showing the results of measuring the mean absolute error in a user-based collaborative filtering recommendation system using 90,000 MovieLens data sets.

FIGS. 4 to 6 show the results of measuring the mean absolute error in a graph, in order to verify the effects of the user-based collaborative filtering recommendation system and method according to the present invention. They compare and show the results (CC, TC, ED, PCC) of evaluating the capacity of the existing system and method using the Euclidean Distance (ED), Pearson Correlation Coefficient (PCC), Tanimoto Coefficient (TC) and Cosine Coefficient (CC) respectively and the results of evaluating the capacity after the amendment of similarity according to the system and method of the present invention as a similarity calculating method.

FIG. 4 is a graph which shows the results of measuring the mean absolute error in the user-based collaborative filtering recommendation system using 30,000 MovieLens data set. FIG. 5 is a graph showing the results of measuring the mean absolute error in a user-based collaborative filtering recommendation system using 60,000 MovieLens data sets. FIG. 6 is a graph showing the results of measuring the mean absolute error in the user-based collaborative filtering recommendation system using 90,000 MovieLens data sets.

The vertical axis of the above graphs shows the mean absolute error (MAE) which is the evaluation index of the preference prediction capacity of the user-based collaborative filtering recommendation system, and the horizontal axis show a case of not applying the significance weighting and a case of applying it in a range of n/10-n/60. The significance weighting is to amend the similarity by giving penalty to the weight value if there is only a small number of items that are evaluated in overlapping manner in the calculation results of the two users' similarity. If the similarity between the two users is 0.6, the number of items that are evaluated by the two users in a duplicated way is 20 and the significance weighting of n/40 is applied, the similarity value between the two users is amended to be 0.6*(20/40)=0.3.

It can be seen from the graphs illustrated in FIGS. 4-6 that the capacity of the user-based collaborative filtering recommendation system and method according to the present invention is excellent, whichever similarity calculating method one selects. Also, it can be seen that the more the number of the data used in the similarity calculation is, the more clearly the excellence of the capacity of the user-based collaborative filtering recommendation system and method according to the present invention is shown.

Figure 7:
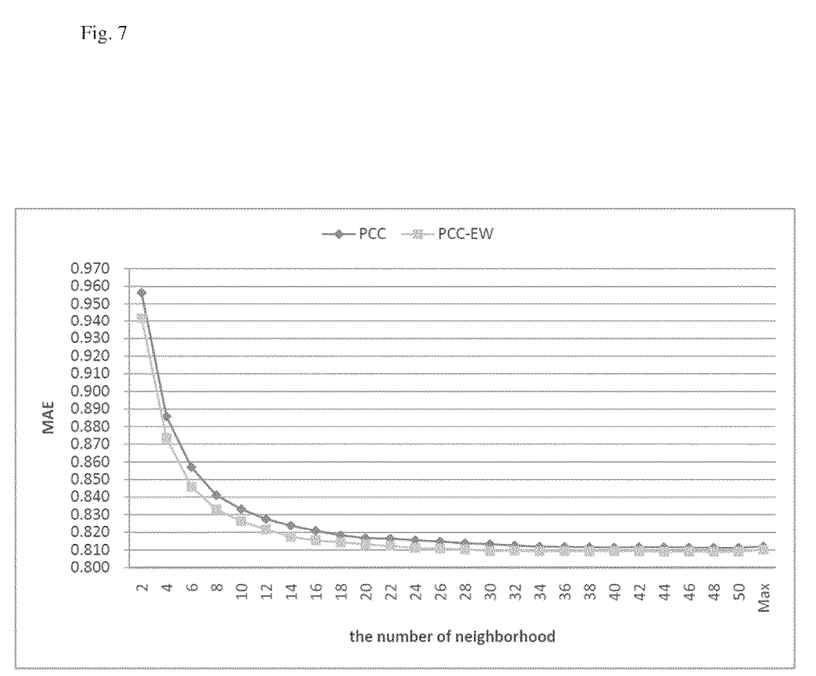
FIG. 7 is a graph showing the development in change of the mean absolute error according to the number of nearest neighbors.

FIG. 7 is a graph that shows the development in change of the mean absolute error according to the number of nearest neighbors and a method of using the Pearson Correlation Coefficient is adopted as a similarity calculating method. As illustrated in FIG. 7, it can be seen that as the number of the nearest neighbors increases, the mean absolute error decreases and the effects of reducing the mean absolute error is greater in the user-based collaborative filtering recommendation system and method according to the present invention.

According to the present invention, it can predict and recommend the user's preference on-line more accurately, and thus can be used in providing the optimal personalization service in this world where the boundary between the information provider and consumer on-line is being collapsed.

Also, the similarity amendment using the information entropy according to the present invention can be adopted regardless of the similarity calculating method, can be adopted regardless of the preference prediction method and thus can be applied to all collaborative filtering recommendation system and methods promptly for all purposes.

What is claimed is:

1. A user-based collaborative filtering recommendation method comprising:
    a first step of calculating the similarity between a user A and another user B;
    a second step of amending the calculated similarity by using each user preference information entropy of the user A and the user B;
    a third step of forming a nearest neighbor list of the user A based on the amended similarity; and
    a fourth step of predicting the preference of the user A by using the preference of the users in the formed nearest neighbor list,
    wherein the second step of amending the similarity comprises the steps of:
    obtaining the information entropy H(A) of the user A and the information entropy H(B) of the user B;
    obtaining a difference value between the information entropy H(A) of the user A and the information entropy H(B) of the user B;
    obtaining a reciprocal number of the value obtained by adding 1 to the difference value between the H(A) and H(B); and
    obtaining the value obtained by multiplying the similarity between the user B and the user A calculated in the similarity calculating step by the reciprocal number of the value obtained by adding 1 to the difference value between H(A) and H(B) as amended similarity.

2. The user-based collaborative filtering recommendation method of claim 1, further comprising a fifth step of letting the user A input actual preference for an item for which the user A does not express his preference before and comparing the input actual preference with the preference predicted in the fourth step.

3. The user-based collaborative filtering recommendation method of claim 1, wherein the fourth step is performed after the first, the second and the third steps are performed for all users.

4. A user-based collaborative filtering recommendation method comprising:
    a first step of calculating the similarity between a user A and another user B;
    a second step of amending the calculated similarity by using each user preference information entropy of the user A and the user B;
    a third step of forming a nearest neighbor list of the user A based on the amended similarity; and
    a fourth step of predicting the preference of the user A by using the preference of the users in the formed nearest neighbor list,
    wherein the second step of amending the similarity is to amend the similarity by using the relation between the user preference information entropy of the user B and the user preference information entropy of the user A as a weight value,
    wherein a weight value that is multiplied by the similarity calculated in the first step is more than 0 and less than 1.

5. The user-based collaborative filtering recommendation method of claim 4, further comprising a fifth step of letting the user A input actual preference for an item for which the user A does not express his preference before and comparing the input actual preference with the preference predicted in the fourth step.

6. The user-based collaborative filtering recommendation method of claim 4, wherein the fourth step is performed after the first, the second and the third steps are performed for all users.

* * * * *